UNITED STATES PATENT OFFICE.

HORACE H. DAY, OF NEW YORK, N. Y., ASSIGNEE OF GEO. TYER AND JOHN HELM.

IMPROVEMENT IN MANUFACTURE OF INDIA-RUBBER GOODS BY MEANS OF ZINC COMPOUNDS.

Specification forming part of Letters Patent No. 6,066, dated January 30, 1849; Reissue No. 141, dated August 7, 1849; Reissue No. 727, dated May 24, 1859.

*To all whom it may concern:*

Be it known that HENRY GEORGE TYER and JOHN HELM, of New Brunswick, in the county of Middlesex, in the State of New Jersey, invented a new and Improved Composition of Caoutchouc, Zinc, and Sulphur, of which the following is a full and exact description of the manner of compounding the same.

The nature of said invention consists in forming a compound of caoutchouc, carbonate of zinc, or other preparations of that metal, as hereinafter mentioned, with sulphur or with the sulphuret or other chemical compounds of zinc, which is perfectly elastic, impermeable to air or water, unchangeable in extreme temperatures, preserving its color without "bloom," and free from the deadly action upon the constitution and health hitherto experienced by the operatives employed in the preparation of metallic or vulcanized rubber.

To enable others skilled in the manufacture of rubber and its compounds to use said invention, the following description is given of the method of mixing and preparing the same.

Take, say, fifty-six pounds of caoutchouc rendered plastic by the usual solvents, or by the combined action of heat and grinding in the machines ordinarily used for that purpose in rubber-works, and gradually add thereto, while masticating, fifty-six pounds of carbonate of zinc, commonly called *Lapis caliminaris*, and finely mixing therewith three pounds and eight ounces of sulphur—the whole to be well kneaded and incorporated. When it is desired to impart color to said composition, as is sometimes necessary in the manufacture of certain descriptions of goods, add in compounding as much lamp-black, ocher, or other coloring-matter as will produce the required result. The mass is then ready to be manufactured into sheets, water-proof cloths, shoes, or such other articles as may be required. The composition should afterward be submitted to steam in a suitable chamber, raising the temperature to 280° to 300° Fahrenheit, continuing the goods in that state from two to six hours, according to the thickness or bulk of the articles to be heated or "cured," which latter process is well known to all manufacturers of metallic rubber.

The invention of said TYER and HELM is not confined to the precise proportions above mentioned, as those are frequently varied according to the requirements of the article into which it is manufactured, decreasing the quantity of zinc when a greater elasticity is wanted, and increasing the same when toughness and ductility only are the requisites. Neither do they at all times grind sulphur in with their composition, but soak the gum in turpentine or camphene, saturated with sulphur; or they merely dust the surface of the manufactured article with sulphur previously to being heated, as above mentioned, and the desired effect will also be produced by introducing the vapor of sulphur under steam or atmospheric pressure into the heated chamber in which the goods are placed, all of which matter of detail respecting the manner of introducing sulphur into their said composition forms no part of their invention, such methods being daily in use by manufacturers of metallic or vulcanized combinations. Their invention is not confined to the use of *Lapis caliminaris* in forming their improved fabric, as they produce a good effect by the use of the oxide, sulphuret, carbonate, and other salts of zinc.

Having thus described the invention of said TYER and HELM, it is proper to state that they do not claim the use of rubber and sulphur alone, or the submitting of rubber or rubber compounds to a high degeee of heat. Neither do they claim to secure the right of coloring rubber, such having frequently been done by rubber manufacturers; but

What is claimed as the invention of said TYER and HELM and desired to secure by Letters Patent is—

India-rubber fabrics made by the combination of caoutchouc in its several varieties with the sulphuret of zinc, or the bisulphuret of zinc, or the hyposulphite of zinc, or the sulphite of zinc, and also with zinc compounds in their several forms, as herein set forth, and sulphur, and in combination with these, in either case, the submitting said compound to the action of steam at a high temperature, the whole being combined and manufactured substantially as above described.

In testimony whereof I, the assignee of the said invention, have hereunto subscribed my name.

May 7, 1859.

HORACE H. DAY.

Witnesses:

ALEXANDER HAY,
W. J. A. FULLER,
J. C. GATES.